United States Patent [19]

Kobayashi et al.

[11] Patent Number: 5,198,476

[45] Date of Patent: Mar. 30, 1993

[54] ULTRAVIOLET-CURABLE SILICONE COMPOSITION FOR REGULATING PEEL STRENGTH

[75] Inventors: Keiji Kobayashi; Katsuya Kanemaru, both of Tokyo, Japan

[73] Assignee: Toshiba Silicone Co., Ltd., Tokyo, Japan

[21] Appl. No.: 722,566

[22] Filed: Jun. 27, 1991

[30] Foreign Application Priority Data

Jun. 29, 1990 [JP] Japan .................................. 2-169768
May 18, 1991 [JP] Japan .................................. 3-142538

[51] Int. Cl.$^5$ .......................... C08F 2/50; C08G 77/20; C08G 77/14
[52] U.S. Cl. ......................................... 522/31; 522/99; 522/149; 522/170; 522/172
[58] Field of Search .................. 522/31, 170, 172, 149, 522/99

[56] References Cited

U.S. PATENT DOCUMENTS

| | | | |
|---|---|---|---|
| 4,370,358 | 1/1983 | Hayes et al. | 522/170 |
| 4,547,431 | 10/1085 | Eckberg | 522/31 |
| 4,954,364 | 9/1990 | Stein et al. | 522/170 |
| 4,988,741 | 1/1991 | Stein | 522/31 |
| 4,994,299 | 2/1991 | Stein et al. | 522/31 |
| 5,063,254 | 11/1991 | Nakos | 522/99 |

FOREIGN PATENT DOCUMENTS

0334068 9/1989 European Pat. Off. .
2084598 4/1982 United Kingdom .

OTHER PUBLICATIONS

Patent Abstracts of Japan, vol. 13, No. 211 May 17, 1989, Abstract of JP-A 1-29485 Nitto Electric Ind. Co., Ltd.

Primary Examiner—Marion E. McCamish
Assistant Examiner—Susan Berman
Attorney, Agent, or Firm—Sughrue, Mion, Zinn, Macpeak & Seas

[57] ABSTRACT

An ultraviolet-curable silicone composition comprising (A) 100 parts by weight of an epoxy-functional polyorganosiloxane which comprises structural units represented by the formula $R^1R^2SiO$, wherein $R^1$ represents hydrogen atom or a monovalent hydrocarbon group and $R^2$ represents hydrogen atom, a monovalent hydrocarbon group, or a monovalent epoxy-functional organic group, and in which at least two of all the organic groups are a monovalent epoxy-functional organic group;

(B) from 1 to 80 parts by weight of at least one copolymer for regulating peel strength, which is soluble in component (A), selected from the group consisting of (i) a copolymer represented by a unit structure of MQ or $M^4Q$, (ii) a copolymer represented by a unit structure of $M^4T$, $MT^4$ or $M^4T^4$, and (iii) a copolymer represented by a unit structure of $M^4DQ$, $MD^4Q$ or $M^4D^4Q$, wherein M represents an $R^3{}_3SiO_{\frac{1}{2}}$ unit, $M^4$ represents an $R^3{}_2R^4SiO_{178}$ unit, D represents an $R^3{}_2SiO$ unit, $D^4$ represents an $R^3R^4SiO$ unit, T represents an $R^3SiO_{3/2}$ unit, $T^4$ represents an $R^4SiO_{3/2}$ unit, and Q represents an $SiO_2$ unit, wherein $R^3$ is a monovalent hydrocarbon group containing no alkenyl group and $R^4$ is an alkenyl group; and (C) a catalytically effective amount of an onium salt as a photoinitiator.

9 Claims, No Drawings

ULTRAVIOLET-CURABLE SILICONE COMPOSITION FOR REGULATING PEEL STRENGTH

FIELD OF THE INVENTION

The present invention relates to an ultraviolet-curable polyorganosiloxane (hereinafter referred to as "silicone") composition. More particularly, the present invention relates to an ultraviolet-curable silicone composition which can be used for arbitrarily regulating the release properties of release papers and the like.

BACKGROUND OF THE INVENTION

It has conventionally been well known that compositions containing silicones as the major component are used to produce pressure-sensitive tapes and various kinds of labels. In these processes, the compositions are applied on surfaces of substrates such as various kinds of papers, synthetic films, and fabrics, and cured to form films of the compositions, thereby imparting non-adhesive properties, i.e., release properties, which prevent or reduce adhesion of tacky substances. Such silicone compositions which impart release properties are required to have properties such as coating property and curability for film formation, and cured films obtained from the compositions are required to have properties such as release properties and the property of not adversely affecting pressure-sensitive adhesive layers (the composition component's property of not transferring to pressure-sensitive adhesive layers; this property is evaluated, for example, in terms of percentage of subsequent adhesion for the pressure-sensitive adhesive layers). In particular, the release properties of cured non-adhesive films are important for the specifications of pressure-sensitive adhesive tapes and various labels, so that the silicone compositions are required to give various degrees of peel strength ranging from light release to heavy release. Pressure-sensitive tapes or the like are roughly classified in terms of peel strength into the following three groups, although measured peel strength values vary depending on the measuring methods and other conditions: those having peel strength of 30 g/5 cm or less are light-release; those having peel strength more than 30 g/5 cm but not more than 100 g/5 cm are medium-release; and those having peel strength exceeding 100 g/5 cm are heavy-release. Such regulated peel strength are required not to change with the lapse of time and to be maintained stably. This long-term stability of peel strength is important when medium-to-heavy release is required.

Known silicone compositions which impart such release properties include a composition which comprises a polyorganosiloxane terminated by a hydroxyl group or a hydrolyzable group and is cured by the condensation reaction of the polyorganosiloxane with a crosslinking agent as disclosed in, for example, JP-A-47-34447 (the term "JP-A" as used herein means an "unexamined published Japanese patent application") and a composition which comprises a polyorganosiloxane containing a silicon-bonded alkenyl group and a polyorganohydrogensiloxane containing 3 or more silicon-bonded hydrogen atoms per molecule and is cured by the addition reaction of the two kinds of siloxane polymers using a platinum catalyst as disclosed in, for example, JP-B-52-40918 (the term "JP-B" as used herein means an "examined Japanese patent publication").

However, these silicone compositions have had a disadvantage that in the case of industrially conducting continuous surface treatment of various substrates with the compositions, curing reaction should be effected at temperatures higher than 100° C., generally 120° C. or more, for rapid film formation. Because of this, applications of the above silicone compositions have been limited to substrates having heat resistance, and the compositions are not applicable to treatment of plastic substrates for which there is an increased desire in recent years.

On the other hand, as a technique for regulating peel strength, it has been disclosed to impart heavy-release properties by adding a tacky silicone resin ingredient to an addition reaction-type silicone composition which gives light-release peel strength as disclosed in, for example, JP-A-59-84935 and JP-A-1-215857. However, films formed from this composition are insufficient in the long-term stability of regulated peel strength, so that there has been a problem that the peel strength becomes low with the lapse of time.

As a means to eliminate the disadvantage of heat-curable silicone compositions, applications of which are limited to substrates having heat resistance, ultraviolet-curable silicone compositions have been developed.

Ultraviolet-irradiating apparatuses are being most extensively used because they are not expensive, maintenance thereof is easy, and there is little danger to the users, although they are one kind of radiation emitters. This method has advantages that curing time can normally be short and that even when the silicone compositions are applied on substrates which are damaged by heat energy, the coatings can be cured by ultraviolet irradiation without heating.

The ultraviolet-curable silicone compositions are roughly divided according to cure mechanism into the following four types:

(1) Compositions which are cured by reacting Si-Vi group (Vi means vinyl group) and Si-H group in the presence of a platinum catalyst by means of ultraviolet rays;

(2) Compositions in which an acrylic-functional silicone is cured in the presence of a radical cleavage-type photocatalyst by means of ultraviolet rays (see JP-A-58-213024 and JP-A-61-293268);

(3) Compositions which are cured by reacting Si-Vi group and SH group in the presence of a radical cleavage-type photocatalyst by means of ultraviolet rays (see JP-A-60- 84329); and (4) Compositions in which an epoxy-functional silicone is cured in the presence of a cation-generating catalyst by means of ultraviolet rays (see JP-A-56-166224, JP-A-58-213024, JP-A-60-47064, JP-A-1-297421, and JP-A-1-311103).

Silicone compositions of type (1) above are economically disadvantageous in that the expensive catalyst should be used in a large quantity.

Compositions of type (2) cure quickly, but curing reaction should be conducted in an inert gas atmosphere because the cure is inhibited by oxygen. For this reason, they are disadvantageous in that apparatuses therefor should be specially designed and the running cost is high due to the use of an inert gas.

Compositions of type (3) have excellent curability with little curing inhibition by oxygen. However, the compositions have disadvantages that because they contain mercapto groups, they have a strong offensive odor, which is unfavorable to the workers, and that the compositions are so unstable that their shelf lives are short.

Compositions of type (4) cure by means of ultraviolet rays without suffering curing inhibition by oxygen and do not emit an offensive odor. Thus, the compositions of this type have exceedingly good properties.

In the case of the epoxy-functional silicone compositions of type (4) above, it has been disclosed to add a polyfunctional epoxy monomer or a mixture of such monomers in order to obtain various degrees of peel strength, particularly around medium-to-heavy peel strength (JP-A-60-47064). This technique, however, has had a problem that when a pressure-sensitive adhesive layer is peeled from the substrate coated with the above treating agent, peeling from the non-adhesive surface comes to be not smooth as the peeling speed increases, making a loud noise (peeling noise), and had another problem that peel strength regulation itself is difficult if delicate regulation is required, so that this technique is unsatisfactory for practical use.

SUMMARY OF THE INVENTION

The present inventors have conducted intensive studies to develop an ultraviolet-curable silicone composition which is free from the above-described problems. As a result, it has now been found that by adding a silicone copolymer comprising specific constituent units to an epoxy-functional silicone composition, peel strength can be arbitrarily regulated without impairing ultraviolet curability, and generation of peeling noises at the time of high-speed peeling can be prevented. The present invention has been completed based on this finding.

Accordingly, one object of the present invention is to provide a silicone composition which eliminates the conventional problems described above.

Another object of the present invention is to provide an ultraviolet-curable silicone composition which possesses advantages of ultraviolet-curable epoxy-functional silicone compositions and has other advantages that it is also applicable to substrates not having heat resistance, and that peel strength can be regulated within the range of from medium release to heavy release and the regulated peel strength is stably maintained over a prolonged period of time.

Further object of the present invention is to provide an ultraviolet-curable silicone composition which can form cured films which have been regulated to have peel strengths in the range of from medium release to heavy release and are free from the problem of generating loud peeling noises when they are peeled from pressure-sensitive adhesive layers at high speeds.

The ultraviolet-curable silicone composition of the present invention comprises (A) 100 parts by weight of an epoxy-functional polyorganosiloxane which comprises structural units represented by the formula $R^1R^2SiO$, wherein $R^1$ represents hydrogen atom or a monovalent hydrocarbon group and $R^2$ represents hydrogen atom, a monovalent hydrocarbon group, or a monovalent epoxy-functional organic group, and in which at least two of all the organic groups are a monovalent epoxy-functional organic group;

(B) from 1 to 80 parts by weight of at least one copolymer for regulating peel strength, which is soluble in component (A), selected from the group consisting of
(i) a copolymer represented by a unit structure of MQ or $M^AQ$,
(ii) a copolymer represented by a unit structure of $M^AT$, $MT^A$ or $M^AT^A$, and
(iii) a copolymer represented by a unit structure of $M^ADQ$, $MD^AQ$, $M^AD^AQ$, wherein
M represents an $R^3_3SiO_{\frac{1}{2}}$ unit,
$M^A$ represents an $R^3_2R^4SiO_{\frac{1}{2}}$ unit,
D represents an $R^3_2SiO$ unit,
$D^A$ represents an $R^3R^4SiO$ unit,
T represents an $R^3SiO_{3/2}$ unit,
$T^A$ represents an $R^4SiO_{3/2}$ unit, and
Q represents an $SiO_2$ unit,
wherein $R^3$ is a monovalent hydrocarbon group containing no alkenyl group and $R^4$ is an alkenyl group; and (C) a catalytically effective amount of an onium salt as a photoinitiator.

DETAILED DESCRIPTION OF THE INVENTION

The epoxy-functional polyorganosiloxane as component (A) in the composition of the present invention is obtained by an addition reaction (hydrosilylation) of a polymethylhydrogensiloxane as a base polymer with an olefinic epoxy monomer such as 4-vinylcyclohexene oxide, allyl glycidyl ether, or 7-epoxy-1-octene, using a catalyst such as a platinum compound. Alternatively, the polyorganosiloxane (A) may be obtained by partially crosslinking polymethylhydrogensiloxane as a base polymer with a polyorganosiloxane having at least two alkenyl groups per molecule, and then subjecting the partially crosslinked polysiloxane to addition reaction with the above-described olefinic epoxy monomer.

For the purpose of causing the silicone composition to cure at a practical rate upon exposure to ultraviolet radiation, at least two per molecule of all the organic groups in component (A) should be an epoxy-functional organic group, and it is preferred that from 1 to 20 mol % of all the organic groups be an epoxy-functional organic group. If the number of epoxy-functional organic groups per molecule is below 2, the final composition cures too slowly and cannot give a cured film having the desired properties because the cure does not proceed to a sufficient degree. On the other hand, if the content of epoxy-functional organic groups exceeds 20 mol %, smooth-release properties cannot be obtained and peeling noises tend to generate.

From the standpoint of easy availability of raw materials, it is preferred that the organic groups other than epoxy-functional organic groups in component (A) be methyl or phenyl.

The copolymer for regulating peel strength, component (B), which is soluble in component (A) is the most characteristic ingredient of the silicone composition of the present invention. This copolymer serves to impart medium-to-heavy peel strength which is stable over a prolonged period of time to cured films to be obtained from the composition of the present invention. Such copolymer for regulating peel strength is at least one member selected from the following silicone resins:
(i) a copolymer represented by a unit structure of MQ or $M^AQ$,
(ii) a copolymer represented by a unit structure of $M^AT$, $MT^A$ or $M^AT^A$, and
(iii) a copolymer represented by a unit structure of $M^ADQ$, $MD^AQ$ or $M^AD^AQ$, wherein
M represents an $R^3_3SiO_{\frac{1}{2}}$ unit,
$M^A$ represents an $R^3_2R^4SiO_{\frac{1}{2}}$ unit,
D represents an $R^3_2SiO$ unit, $D^A$ represents an $R^3R^4SiO$ unit,
T represents an $R^3SiO_{3/2}$ unit,
$T^A$ represents an $R^4SiO_{3/2}$ unit, and
Q represents an $SiO_2$ unit,
wherein $R^3$ is a monovalent hydrocarbon group containing no alkenyl group and $R^4$ is an alkenyl group.

In component (B), the content of each structural unit is not particularly limited. However, from the standpoint of the relationship between the amount of component (B) added and peel strength regulation, it is practically preferred that the content of M or $M^A$ units be from 25 to 70 mol %. If the content of M or $M^A$ units is below 25 mol %, the compatibility of component (B) with component (A) is reduced, and cured films of the resulting composition have too high peel strength, so that peel strength regulation becomes difficult. If the M or $M^A$ unit content exceeds 70 mol %, the peel strength-regulating effect is decreased and, hence, component (B) is required to be added in an increased amount, which may result in poor film-forming properties of the resulting composition and impaired properties of cured films.

The D or $D^A$ structural unit is not essential in component (B). However, in the case where the copolymer contains such units, the content thereof preferably is 50 mol % or less. If the D or $D^A$ unit content exceeds 50 mol %, the peel strength-regulating effect is decreased.

It is preferred that the copolymer for regulating peel strength contains an alkenyl group represented by $R^4$ because the $R^4$ group brings about excellent peel strength-regulating effect. Examples of the alkenyl group include vinyl and allyl groups, with vinyl group being preferred from the standpoints of easy availability of raw materials and cost.

In component (B), the monovalent hydrocarbon group $R^3$ containing no alkenyl group preferably is methyl or phenyl from the standpoint of easy availability of raw materials.

The amount of component (B) added to component (A) is from 1 to 80 parts by weight, preferably from 5 to 70 parts by weight, per 100 parts by weight of component (A). If the amount of component (B) added is below 1 part by weight, the effect of increasing peel strength becomes insufficient. If the amount thereof exceeds 80 parts by weight, release properties are impaired disadvantageously.

The photoinitiator (C) is not particularly limited as long as it is an onium salt which is compatible with components (A) and (B) and is capable of cleaving an epoxy ring with light.

A preferred photoinitiator used in the present invention is an onium salt represented by the formula $R^5_2I^+MX_n^-$, $R^5_3S^+MX_n^-$, $R^5_3Se^+MX_n^-$, $R^5_4P^+MX_n^-$, or $R^5_4N^+MX_n^-$ (wherein $R^5$ which may be the same or different each is a $C_1$–$C_{30}$ organic group selected from the group consisting of (1) a $C_6$–$C_{20}$ aromatic hydrocarbon group, (2) a $C_6$–$C_{20}$ aromatic hydrocarbon group which has been substituted with from 1 to 4 monovalent organic groups or atoms selected from a $C_1$–$C_8$ alkoxyl group, a $C_1$–$C_8$ alkyl group, nitrogen atom, chlorine atom, bromine atom, cyano group, carboxyl group, and mercapto group, and (3) an aromatic hydrocarbon group selected from pyridyl group, thiophenyl group, and pyranyl group; and $MX_n^-$ is a non-basic and non-nucleophilic anion selected from the group consisting of $BF_4^-$, $PF_6^-$, $AsF_6^-$, $SbF_6^-$, $SbCl_6^-$, $HSO_4^-$, and $ClO_4^-$). The amount of this photoinitiator added is not particularly limited, but is preferably from 0.5 to 3.0 parts by weight per 100 parts by weight of component (A) from the standpoints of curing rate and cost.

Non-adhesive films obtained by curing the composition of the present invention can be regulated to have arbitrary peel strength without impairing the ultraviolet curability of the composition, and the peel strength of the cured films changes only little with the lapse of time. In the case where the composition of the present invention is used to form the release coating in a pressure-sensitive tape, the release coating does not impair the tack strength of the pressure-sensitive adhesive layer peeled from the release coating and does not otherwise adversely affect the adhesive layer. Even in the case where the peel strength is regulated to obtain heavy release, peeling of the pressure-sensitive adhesive layer from the release coating can be conducted smoothly without generating peeling noises. Furthermore, since the composition of the present invention can be cured easily and rapidly at a low temperature only by means of ultraviolet irradiation without the necessity of heating, it not only is applicable even to plastic materials having low heat resistance, but also can be applied to commonly used substrates such as paper to produce, at high speed, various kinds of tapes and labels having different peel strengths. Therefore, the composition of the present invention is useful to attain significantly improved production efficiencies of these processes.

The present invention will be explained below in more detail by reference to Examples and Comparative Examples, but the Examples should not be construed as limiting the scope of the invention. In these examples, all parts are by weight.

Sample Preparation

Each of the compositions obtained in Examples and Comparative Examples was coated on a polyethylene-laminated paper (75 g/m²) at a coating thickness of 1.3 g/m². Using an irradiation apparatus comprising a conveyor for conveying coated paper and a single, high-pressure mercury lamp (80 W/cm) installed at a height of 10 cm from the conveyor surface, the coating was cured while the coated paper was conveyed by the conveyor at a speed of 5 m/min. After curing, the resulting coated papers were aged at room temperature for 1 to 28 days and then subjected to the following tests.

Peel Strength Measurement

To the surface of the cured coating on an aged coated paper, No. 502 Tape (trade name, manufactured by Nitto Denko Corporation, Japan) was applied by pressing the tape by moving a 2-kg rubber roller forward and backward once on the tape. This sample was then aged at 100° C. for 1 hour. After the aged sample was cooled to room temperature, the tape was peeled off in the 180° direction at a speed of 0.3 m/min to measure the peel strength.

Measurement of Percentage of Subsequent Adhesion

To the surface of the cured coating on a coated paper aged for 1 day, Nitto 31B Tape (trade name, manufactured by Nitto Denko Corporation; width 2.5 cm) was applied. The applied tape was allowed to stand at 70° C. for 20 hours under a load of 20 g/cm². The resulting tape was peeled off, and then applied to a stainless-steel plate (JIS C2107) by pressing the tape with a 2-kg rubber roller. This sample was aged at 25° C. for 3 hours, and the tape was then peeled off in the 180° direction to measure the peel strength (f). On the other hand, a blank sample was prepared using Nitto 31B Tape applied to a polytetrafluoroethylene film, and its peel strength (f₀) was measured in the same manner as the above.

Percentage of subsequent adhesion (%) was calculated using the following equation.

Percentage of Subsequent Adhesion (%) = $f/f_0 \times 100$

Evaluation of Peeling State and Peeling Noise

Peeling state and peeling noise were examined in the peel strength measurement described above, and were evaluated based on the following criteria.

Peeling State

○ . . . . . Peel strength is constant and peeling chart is stable.

x . . . . . Peel strength is not constant and peeling chart is unstable.

Peeling Noise

○ . . . . . Tape was peeled off smoothly without generating peeling noise.

△ . . . . . Tape was peeled off while slightly generating a peeling noise.

x . . . . . Peeling of the tape was not smooth, generating a loud peeling noise.

Synthesis of Epoxy-Modified Silicone Oil (I)

With 1,000 parts of a polymethylhydrogensiloxane both ends of which had been blocked with a trimethylsilyl group, having a viscosity of 16 cSt at 25° C. and a hydrogen content of 0.16% by weight was mixed 200 parts of a polydimethylsiloxane both ends of which had been blocked with a dimethylvinyl group, having a viscosity of 400 cSt at 25° C. To the resulting mixture was added an isopropyl alcohol (IPA) solution of chloroplatinic acid in an amount of 15 ppm in terms of the amount of platinum. Reaction was then conducted at 50° C. for 1 hour. To the resulting reaction mixture, 250 parts of 4-vinylcyclohexene oxide was added dropwise over a period of 2 hours. Although this addition was accompanied with heat generation, the reaction mixture was kept at a temperature between 50° and 60° C. to conduct reaction for 4 hours. Thereafter, topping was effected at 130° C. for 2 hours under a pressure of 10 mmHg to remove unreacted ingredients and low-boiling fractions. Thus, epoxy-modified silicone oil (I) was obtained which had a viscosity as measured at 25° C. of 250 cSt.

Synthesis of Epoxy-Modified Silicone Oil (II)

To 1,000 parts of a polymethylhydrogensiloxane both ends of which had been blocked with a dimethylhydrosilyl group, having a viscosity of 23 cSt at 25° C. and a hydrogen content of 0.10% by weight was added an IPA solution of chloroplatinic acid in an amount of 15 ppm in terms of the amount of platinum. This mixture was heated to 50° C. To the mixture was then added dropwise 200 parts of 4-vinylcyclohexene oxide over a period of 2 hours. Thereafter, reaction was conducted at 50° to 60° C. for 4 hours, and topping was then effected at 130° C. for 2 hours under a pressure of 10 mmHg to remove unreacted ingredients and low-boiling fractions. Thus, epoxy-modified silicone oil (II) was obtained which had a viscosity as measured at 25° C. of 300 cSt.

Synthesis of Epoxy-Modified Silicone Oil (III)

To 50 parts of 4-vinylcyclohexene oxide was added 1,000 parts of toluene. To the mixture was further added an IPA solution of chloroplatinic acid in an amount of 15 ppm in terms of the amount of platinum. While the temperature of this mixture was kept between 100° and 115° C., 1,000 parts of a polymethylhydrogensiloxane both ends of which had been blocked with a trimethylsilyl group, having a viscosity of 18 cSt at 25° C. and a hydrogen content of 0.32% by weight was added dropwise to the mixture over a period of 2 hours. Thereafter, reaction was conducted at 120° C. for 4 hours, and topping was then effected at 130° C. for 3 hours under a pressure of 10 mmHg to remove unreacted ingredients and low-boiling fractions. Thus, epoxy-modified silicone oil (III) was obtained which had a viscosity as measured at 25° C. of 280 cSt.

EXAMPLE 1

30 Parts of a 60 wt % toluene solution of a silicone resin represented by the average composition formula $[(CH_3)_3SiO_{\frac{1}{2}}]_6[(CH_3)_2SiO]_2[SiO_2]_8$ was mixed with 100 parts of epoxy-modified silicone oil (I). Topping was then conducted at 120° C. for 2 hours under a pressure of 10 mmHg. After the residual mixture was cooled to 25° C., 2 parts of bis(dodecylphenyl)iodonium hexafluoroantimonate was added thereto, and the resulting mixture was stirred to give a coating fluid.

COMPARATIVE EXAMPLE 1

To 100 parts of epoxy-modified silicone oil (I) was added 2 parts of bis(dodecylphenyl)iodonium hexafluoroantimonate. This mixture was stirred to give a coating fluid.

COMPARATIVE EXAMPLE 2

A coating fluid was prepared in the same manner as in Example 1 except that the amount of the 60 wt % toluene solution of silicone resin was changed to 1 part.

COMPARATIVE EXAMPLE 3

A coating fluid was prepared in the same manner as in Example 1 except that the amount of the 60 wt % toluene solution of silicone resin was changed to 150 parts.

The coating fluids obtained in Example 1 and Comparative Examples 1 to 3 were examined for peel strength, percentage of subsequent adhesion, peeling state, and peeling noise according to the evaluation methods as described hereinabove. The results obtained are shown in Table 1.

TABLE 1

|  | Peel Strength (g/5 cm) | | | | Percentage of Subsequent Adhesion (%) | Peeling State | Peeling Noise |
| --- | --- | --- | --- | --- | --- | --- | --- |
|  | After 1 day | After 7 days | After 14 days | After 28 days |  |  |  |
| Comparative Example 1 | 30 | 32 | 31 | 32 | 97 | ○ | ○ |

TABLE 1-continued

| | Peel Strength (g/5 cm) | | | | Percentage of Subsequent Adhesion (%) | Peeling State | Peeling Noise |
|---|---|---|---|---|---|---|---|
| | After 1 day | After 7 days | After 14 days | After 28 days | | | |
| Example 1 | 62 | 59 | 64 | 63 | 99 | ○ | ○ |
| Comparative Example 2 | 31 | 30 | 32 | 30 | 97 | ○ | ○ |
| Comparative Example 3 | not peeled | not peeled | not peeled | not peeled | 97 | — | — |

EXAMPLE 2

10 Parts of a 60 wt % toluene solution of a silicone resin represented by the average composition formula $[(CH_3)_3SiO_{\frac{1}{2}}]_{10}[SiO_2]_8$ was mixed with 100 parts of epoxy-modified silicone oil (I). Topping was then conducted at 120° C. for 2 hours under a pressure of 10 mmHg. After the residual mixture was cooled to 25° C., 3 parts of bis(dodecylphenyl)iodonium hexafluoroantimonate was added thereto and the resulting mixture was stirred to give a coating fluid.

EXAMPLE 3

A coating fluid was prepared in the same manner as in Example 2 except that the amount of the 60 wt % toluene solution of silicone resin was changed to 30 parts.

EXAMPLE 4

A coating fluid was prepared in the same manner as in Example 2 except that the amount of the 60 wt % toluene solution of silicone resin was changed to 60 parts.

EXAMPLE 5

A coating fluid was prepared in the same manner as in Example 2 except that the amount of the 60 wt % toluene solution of silicone resin was changed to 90 parts.

The coating fluids obtained in Examples 2 to 5 were examined for peel strength, percentage of subsequent adhesion, peeling state, and peeling noise according to the evaluation methods as described hereinabove. The results obtained are shown in Table 2.

TABLE 2

| | Peel Strength (g/5 cm) | | | | Percentage of Subsequent Adhesion (%) | Peeling State | Peeling Noise |
|---|---|---|---|---|---|---|---|
| | After 1 day | After 7 days | After 14 days | After 28 days | | | |
| Example 2 | 40 | 43 | 44 | 42 | 99 | ○ | ○ |
| Example 3 | 73 | 71 | 72 | 70 | 100 | ○ | ○ |
| Example 4 | 112 | 115 | 116 | 116 | 100 | ○ | ○ |
| Example 5 | 161 | 163 | 165 | 162 | 100 | ○ | ○ |

EXAMPLE 6

50 Parts of a 60 wt % xylene solution of a silicone resin represented by the average composition formula $[(CH_2=CH)(CH_3)_2SiO_{\frac{1}{2}}]_4[CH_3SiO_{3/2}]_{10}$ was mixed with 100 parts of epoxy-modified silicone oil (II). Topping was then conducted at 120° C. for 2 hours under a pressure of 10 mmHg. After the residual mixture was cooled to 25° C., 2 parts of bis(dodecylphenyl)iodonium hexafluoroantimonate was added thereto and the resulting mixture was stirred to give a coating fluid.

COMPARATIVE EXAMPLE 4

To 100 parts of epoxy-modified silicone oil (II) was added 2 parts of bis(dodecylphenyl)iodonium hexafluoroantimonate. This mixture was stirred to give a coating fluid.

The coating fluids obtained in Example 6 and Comparative Example 4 were examined for peel strength, percentage of subsequent adhesion, peeling state, and peeling noise according to the evaluation methods as described hereinabove. The results obtained are shown in Table 3.

TABLE 3

| | Peel Strength (g/5 cm) | | | | Percentage of Subsequent Adhesion (%) | Peeling State | Peeling Noise |
|---|---|---|---|---|---|---|---|
| | After 1 day | After 7 days | After 14 days | After 28 days | | | |
| Example 6 | 77 | 74 | 76 | 75 | 99 | ○ | ○ |
| Comparative Example 4 | 43 | 42 | 45 | 43 | 98 | ○ | △ |

COMPARATIVE EXAMPLE 5

To 100 parts of epoxy-modified silicone oil (III) was added 2 parts of bis(dodecylphenyl)iodonium hexafluoroantimonate. This mixture was stirred to give a coating fluid.

The coating fluid prepared above was examined according to the evaluation methods as described hereinabove. The results obtained are as follows. The peel strength was 145 g/5 cm after 1 day, 139 g/5 cm after 7 days, 152 g/5 cm after 14 days, and 141 g/5 cm after 28 days; the percentage of subsequent adhesion was 100%; and the peeling state was x because peeling of the tape was not smooth and a loud peeling noise was generated.

EXAMPLE 7

117 Parts of a 60 wt % toluene solution of a silicone resin represented by the average composition formula $[(CH_3)_3SiO_{\frac{1}{2}}]_6[(CH_3)(CH_2=CH)SiO]_{12}[SiO_2]_2$ was mixed with 100 parts of epoxy-modified silicone oil (I). Topping was then conducted at 120° C. for 2 hours under a pressure of 10 mmHg. After the residual mixture was cooled to 25° C., 2 parts of bis(dodecylphenyl)iodonium hexafluoroantimonate was added thereto and the resulting mixture was stirred to give a coating fluid.

EXAMPLE 8

30 Parts of a 60 wt % toluene solution of a silicone resin represented by the average composition formula [(CH$_3$)$_3$SiO$_{\frac{1}{2}}$]$_{10}$[SiO$_2$]$_8$ was mixed with 100 parts of epoxy-modified silicone oil (III). Topping was then conducted at 120° C. for 2 hours under a pressure of 10 mmHg. After the residual mixture was cooled to 25° C., 3 parts of bis(dodecylphenyl)iodonium hexafluoroantimonate was added thereto and the resulting mixture was stirred to give a coating fluid.

COMPARATIVE EXAMPLE 6

A coating fluid was prepared in the same manner as in Example 7 except that the amount of the 60 wt % toluene solution of silicone resin was changed to 1 part.

COMPARATIVE EXAMPLE 7

A coating fluid was prepared in the same manner as in Example 7 except that the amount of the 60 wt % toluene solution of silicone resin was changed to 150 parts.

COMPARATIVE EXAMPLE 8

2 Parts of limonene dioxide was mixed with 100 parts of epoxy-modified silicone oil (II). To the mixture was then added 2 parts of bis(dodecylphenyl)iodonium hexafluoroantimonate. The resulting mixture was stirred to give a coating fluid.

COMPARATIVE EXAMPLE 9

4 Parts of limonene dioxide was mixed with 100 parts of epoxy-modified silicone oil (III). To the mixture was then added 2 parts of bis(dodecylphenyl)iodonium hexafluoroantimonate. The resulting mixture was stirred to give a coating fluid.

COMPARATIVE EXAMPLE 10

To 100 parts of a silicone oil represented by the average composition formula [(CH$_2$=CH)(CH$_3$)$_2$SiO$_{\frac{1}{2}}$]$_2$[(CH$_3$)$_2$SiO]$_{245}$[(CH$_2$=CH)(CH$_3$)SiO]$_3$ was added 30 parts of a 60 wt % toluene solution of a silicone resin represented by the average composition formula [(CH$_3$)$_3$SiO$_{\frac{1}{2}}$]$_{10}$[SiO$_2$]$_8$. This mixture was stirred until it became uniform, and topping was then conducted at 120° C. for 2 hours under a pressure of 10 mmHg. After the residual mixture was cooled to 25° C., 3 parts of [(CH$_3$)$_3$SiO$_{\frac{1}{2}}$]$_2$[(CH$_3$)HSiO]$_{38}$ and 2 parts of a chloroplatinic acid isopropyl alcohol solution (having a platinum content of 1.0 wt % in terms of the amount of platinum atom) were added thereto, and the resulting mixture was stirred to give a coating fluid. This coating fluid was coated on the same polyethylene-laminated paper as described in [Sample Preparation] given hereinabove at the same coating thickness, and the coating was heat-cured in an oven at 140° C. for 30 seconds. This sample was subjected to the same evaluation tests as described above.

The coating fluids obtained in Examples 7 and 8 and Comparative Examples 6 to 10 were examined for peel strength, percentage of subsequent adhesion, peeling state, and peeling noise according to the evaluation methods as described hereinabove. The results obtained are shown in Table 4.

TABLE 4

|  | Peel Strength (g/5 cm) | | | | Percentage of Subsequent Adhesion (%) | Peeling State | Peeling Noise |
| --- | --- | --- | --- | --- | --- | --- | --- |
|  | After 1 day | After 7 days | After 14 days | After 28 days |  |  |  |
| Exmaple 7 | 462 | 479 | 471 | 467 | 99 | ◯ | ◯ |
| Example 8 | 170 | 172 | 175 | 171 | 100 | ◯ | ◯ |
| Comparative Example 6 | 30 | 31 | 32 | 31 | 97 | ◯ | ◯ |
| Comparative Example 7 | not peeled | not peeled | not peeled | not peeled | 97 | — | — |
| Comparative Example 8 | 83 | 82 | 85 | 83 | 98 | x | △ |
| Comparative Example 9 | 140 | 136 | 150 | 135 | 100 | x | x |
| Comparative Example 10 | 173 | 106 | 62 | 54 | 98 | ◯ | ◯ |

While the invention has been described in detail and with reference to specific embodiments thereof, it will be apparent to one skilled in the art that various changes and modifications can be made therein without departing from the spirit and scope thereof.

What is claimed is:

1. An ultraviolet-curable silicone composition comprising
   (A) 100 parts by weight of an epoxy-functional polyorganosiloxane which comprises structural units represented by the formula R$^1$R$^2$SiO, wherein R$^1$ represents hydrogen atom or a monovalent hydrocarbon group and R$^2$ represents hydrogen atom, a monovalent hydrocarbon group, or a monovalent epoxy-functional organic group, and in which at least two of all the organic groups are a monovalent epoxy-functional organic group;
   (B) from 1 to 80 parts by weight of at least one copolymer for regulating peel strength, which is soluble in component (A), selected from the group consisting of
      (i) a copolymer represented by a unit structure of MQ or M$^A$Q,
      (ii) a copolymer represented by a unit structure of M$^A$T, MT$^A$ or M$^A$T$^A$, and
      (iii) a copolymer represented by a unit structure of M$^A$DQ, MD$^A$Q or M$^A$D$^A$Q, wherein
      M represents an R$^3{}_3$SiO$_{\frac{1}{2}}$ unit,
      M$^A$ represents an R$^3{}_2$R$^4$SiO$_{\frac{1}{2}}$ unit,
      D represents an R$^3{}_2$SiO unit,
      D$^A$ represents an R$^3$R$^4$SiO unit,
      T represents an R$^3$SiO$_{3/2}$ unit,
      T$^A$ represents an R$^4$SiO$_{3/2}$ unit, and
      Q represents an SiO$_2$ unit,
         wherein R$^3$ is a monovalent hydrocarbon group containing no alkenyl group and R$^4$ is an alkenyl group; and
   (C) a catalytically effective amount of an onium salt as a photoinitiator.

2. An ultraviolet-curable silicone composition as claimed in claim 1, wherein from 1 to 20 mol % of all the organic groups in the epoxy-functional polyorganosiloxane (A) are an epoxy-functional organic group.

3. An ultraviolet-curable silicone composition as claimed in claim 1, wherein the organic groups other than epoxy-functional organic groups in the epoxy-functional polyorganosiloxane (A) are methyl or phenyl.

4. An ultraviolet-curable silicone composition as claimed in claim 1, wherein the content of M or $M^A$ in the units in the copolymer (B) for regulating peel strength is from 25 to 70 mol %.

5. An ultraviolet-curable silicone composition as claimed in claim 1, wherein the content of D or $D^A$ in the units in the copolymer (B) for regulating peel strength is 50 mol % or less.

6. An ultraviolet-curable silicone composition as claimed in claim 1, wherein said copolymer (B) for regulating peel strength contains an alkenyl group represented by $R^4$.

7. An ultraviolet-curable silicone composition as claimed in claim 6, wherein the alkenyl group represented by $R^4$ is vinyl.

8. An ultraviolet-curable silicone composition as claimed in claim 1, wherein in the copolymer (B) for regulating peel strength, the monovalent hydrocarbon group represented by $R^3$ and containing no alkenyl group is methyl or phenyl.

9. An ultraviolet-curable silicone composition as claimed in claim 1, wherein said photoinitiator (C) is an onium salt represented by a formula $R^5{}_2I^+MX_n{}^-$, $R^5{}_3S^+MX_n{}^-$, $R^5{}_3Se^+MX_n{}^-$, $R^5{}_4P^+MX_n{}^-$, or $R^5{}_4N^+MX_n{}^-$, wherein $R^5$ is an aromatic hydrocarbon group and $MX_n{}^-$ is an anion selected from the group consisting of $BF_4{}^-$, $PF_6{}^-$, $AsF_6{}^-$, $SbF_6{}^-$, $SbCl_6{}^-$, $HSO_4{}^-$, and $ClO_4{}^-$.

* * * * *